(12) United States Patent
Kurosawa

(10) Patent No.: US 7,566,180 B2
(45) Date of Patent: Jul. 28, 2009

(54) SHUTTER UNIT FOR A DIGITAL CAMERA

(75) Inventor: Yuichi Kurosawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 242 days.

(21) Appl. No.: 11/281,511

(22) Filed: Nov. 18, 2005

(65) Prior Publication Data
US 2006/0110156 A1 May 25, 2006

(30) Foreign Application Priority Data
Nov. 19, 2004 (JP) ............................. 2004-335445

(51) Int. Cl.
G03B 9/08 (2006.01)

(52) U.S. Cl. .................. 396/449; 396/452; 396/458; 396/488; 348/342

(58) Field of Classification Search ................. 396/449, 396/452, 457, 458, 483, 488, 451, 494; 348/342
See application file for complete search history.

(56) References Cited

U.S. PATENT DOCUMENTS

| | | | | |
|---|---|---|---|---|
| 3,821,795 A | * | 6/1974 | Okano ........................ 348/291 |
| 4,512,642 A | * | 4/1985 | Ito et al. ..................... 396/548 |
| 5,532,787 A | * | 7/1996 | Konagaya ..................... 355/71 |
| 5,708,885 A | | 1/1998 | Nomura et al. |
| 5,938,989 A | * | 8/1999 | Hambright ................... 264/2.5 |
| 6,147,732 A | * | 11/2000 | Aoyama et al. ............. 349/112 |
| 6,726,381 B2 | * | 4/2004 | Takahashi et al. ........... 396/486 |
| 2001/0010594 A1 | * | 8/2001 | Oono ......................... 359/497 |

FOREIGN PATENT DOCUMENTS

JP 2004-173139 6/2004

OTHER PUBLICATIONS

English language Abstract of JP 2004-173139.
U.S. Appl. No. 10/715,449, filed Nov. 19, 2003.

* cited by examiner

Primary Examiner—W. B. Perkey
Assistant Examiner—Michael A Strieb
(74) Attorney, Agent, or Firm—Greenblum & Bernstein, P.L.C.

(57) ABSTRACT

A digital camera is provided with an imaging element including a plurality of pixels, a shutter unit capable of intercepting light transmitted from an object to the imaging element, and an optical low pass filter adapted to allow light with predetermined lower spatial frequencies to pass therethrough. The optical low pass filter is embedded in the shutter unit.

18 Claims, 7 Drawing Sheets

SHUTTER UNIT FOR A DIGITAL CAMERA

BACKGROUND OF THE INVENTION

The present invention relates to a digital camera having an imaging element such as a CCD (charge-coupled device) and a MOS (metal oxide semiconductor), and particularly to an SLR (single-lens reflex) digital camera having a shutter.

An imaging element used in a digital camera for capturing an object image such as a CCD and a MOS generally includes a multiplicity of photo receiving cells (i.e., pixels) that are arranged uniformly in matrix. Due to the uniformity of the pixels, when an object image with a pattern is captured by the imaging element, an interference occurs between the two patterns, and a false color (i.e., moiré fringe) is viewed. To avoid such a false color from occurring, an optical low pass filter (hereinafter referred to as LPF) is provided to an image receiving area of the imaging element so as light with specific higher spatial frequency to cause interferences is blurred. An example of such technique is disclosed in Japanese Patent Provisional Publication No. P2004-173139. For such an optical LPF, various types of materials are used, including a birefringent crystal panel and a lithium niobate panel. Also, a diffraction grating, which splits light with a specific wavelength, and a phase filter, which cuts off light with a specific wavelength, is used.

When an imaging element with such an optical LPF is applied to a digital camera with a shutter, such as an SLR, the optical LPF is arranged between the shutter and the imaging element. As seen in an SLR camera illustrated in FIG. 7, for example, on a front surface of the camera body, a lens mount is provided, to which a photographing lens unit (not shown) is detachably attached. Light passed through the photographing lens is reflected by a movable half mirror (quick return mirror) 11 and forms an image on a focusing glass 12. The image formed on the focusing glass 12 is further reflected inside a pentaprism 13 and can be observed through an eyepiece lens 14 Behind the movable half mirror 11 is provided a focal-plane shutter unit 18. Further behind the shutter unit 18 is provided an imaging element 20 which captures an object image when a shutter of the focal-plane shutter unit 18 is opened. Furthermore, an optical LPF 19 is provided in front of the imaging element. It should be noted that, in a camera, an infra-red cutoff filter is generally provided to the imaging element in addition to the optical LPF 19, however, the infra-red cutoff filter in this example is integrated to a protective glass that is provided to the surface of the imaging element 20.

It should be noted that such an optical LPF (e.g., the birefringent crystal panel or the diffraction grating) requires a considerable thickness, therefore an interspace between the shutter unit 18 and the imaging element 20 may be large. In that case, the imaging element 20 is required to be arranged in a farther position from the shutter unit 18. For this reason, the camera should be configured to be large in the direction of the optical axis.

In addition, it should be noted that, when dirt and/or dust adhered to the surface of the optical LPF is removed by a user using a cleaning tool, the shutter is maintained open. However, if a battery is exhausted or an AC (alternating current) adapter is unexpectedly removed from the camera during the cleaning, or a finger of the user pressing a shutter button to hold the shutter open by a bulb setting is unintentionally removed, the shutter closes and may be damaged by the cleaning tool.

SUMMARY OF THE INVENTION

Aspects of the present invention are advantageous in that a digital camera downsized in depth is provided. Also, aspects of the present invention are advantageous in that a digital camera wherein the dirt and/or dust adhered to the optical LPF thereof can be effectively and nondestructively removed is provided.

According to some aspects of the present invention, there is provided a digital camera having an imaging element including a plurality of pixels, a shutter unit capable of intercepting light transmitted from an object to the imaging element, and an optical low pass filter adapted to allow light with predetermined lower spatial frequencies to pass therethrough. The optical low pass filter is embedded in the shutter unit.

Optionally, the shutter unit may include a shutter panel formed with an aperture portion. The aperture portion may be formed with the optical low pass filter.

Optionally, the optical low pass filter may be made of transparent resin, which is integrally formed with the shutter panel.

Optionally, the optical low pass filter may include a birefringent element made of transparent resin Optionally, the transparent resin may be made of one of polyethylene, polycarbonate, and polyvinyl chloride Optionally, the optical low pass filter may be configured to split the light transmitted from the object.

Optionally, the optical low pass filter may include a diffractive grating made of transparent resin.

Optionally, the transparent resin may be made of one of polymethyl methacrylate, polycarbonate, and polystyrene.

Optionally, the shutter unit may include a focal-plane shutter and a shutter panel formed with an aperture portion. The focal-plane shutter may be configured to open and close the aperture portion. The optical low pass filter may be provided to the aperture portion.

According to another aspects of the present invention, there is provided a shutter unit for a digital camera. The shutter unit is capable of intercepting light transmitted from an object to the imaging element. The shutter unit includes an optical low pass filter adapted to allow light with predetermined lower spatial frequencies to pass therethrough. The optical low pass filter is embedded in the shutter unit.

BRIEF DESCRIPTION OF THE ACCOMPANYING DRAWINGS

DETAILED DESCRIPTION OF THE EMBODIMENT

First Embodiment

Referring to the accompanying drawings, a digital camera according to an embodiment of the invention will be described in detail.

Figure 1:
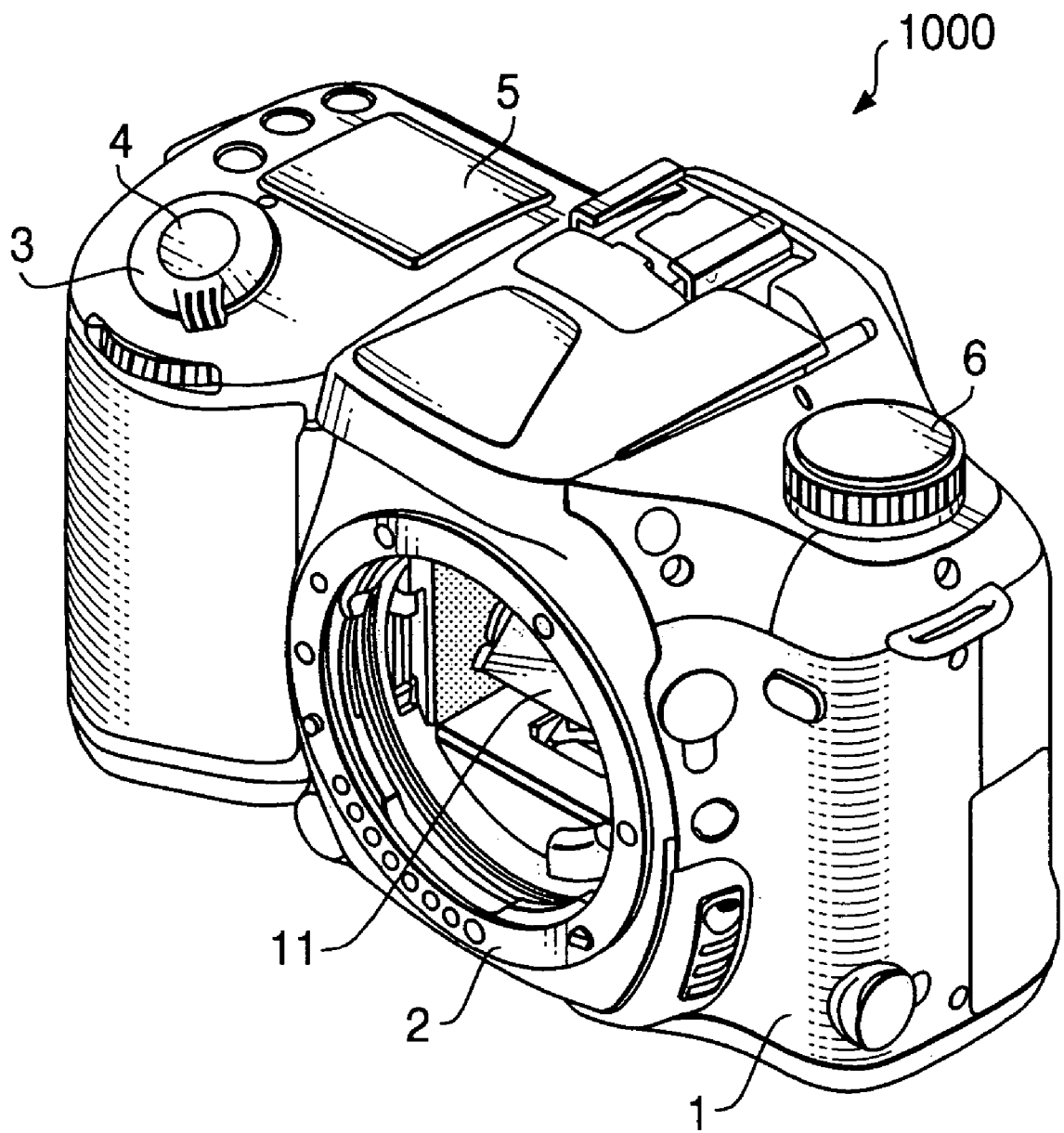
FIG. 1 is a perspective view showing an appearance of a digital camera according to a first embodiment of the present invention.

FIG. 1 is a perspective view showing an appearance of a digital camera 1000 according to a first embodiment of the present invention. The digital camera 1000 is a digital SLR camera employing interchangeable lens system. As shown in FIG. 1, the camera 1000 has a camera body 1. On a front surface of the camera body 1, a lens mount 2 is provided, to which a photographing lens unit (not shown) is detachably attached. On the upper surface of the camera body 1, a main switch 3 having a rotary lever, a shutter button 4 to be pressed, an LCD (liquid crystal display) 5 for displaying various information, and a mode dial 6 for setting various photographing modes are provided. The shutter button 4 functions as a photometry switch when half-depressed and a release switch when fully depressed.

Figure 2:
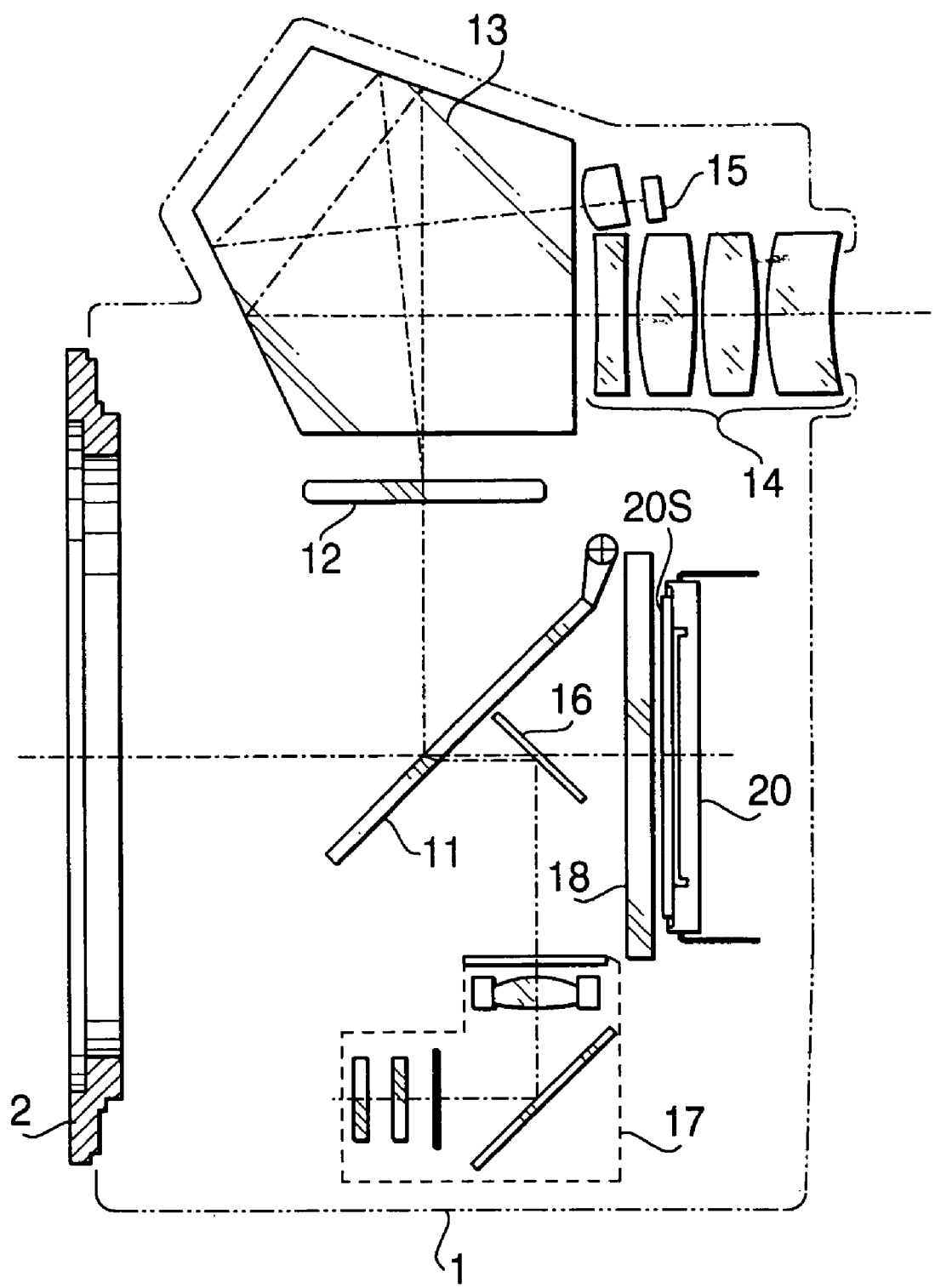
FIG. 2 is a cross-sectional side view of main components of the digital camera according to the embodiment of the invention.

FIG. 2 is a cross-sectional side view of main components of the digital camera 1000. Light from an object is reflected by a movable half mirror (quick return mirror) 11 and forms an image on a focusing glass 12. The image formed on the focusing glass 12 is further reflected inside a pentaprism 13, which erects the image, and can be observed through an eyepiece lens 14. A photometer 15 that evaluates amount of the light is provided in a vicinity of the eyepiece lens 14. The image passed through the movable half mirror 11 is further reflected by a second mirror 16 and received by a known AF (automatic focusing) module 17, which serves as a distance measuring device to evaluate a distance to the object and controls focusing. Description in detail of configuration of the AF module 17 is omitted, as the configuration is known. The image passed through the movable half mirror 11 is transmitted to a focal-plane shutter unit 18 (see FIG. 3), and received by an imaging element 20 (when the shutter is opened), which includes, for example, a CCD or a MOS.

Figure 3:
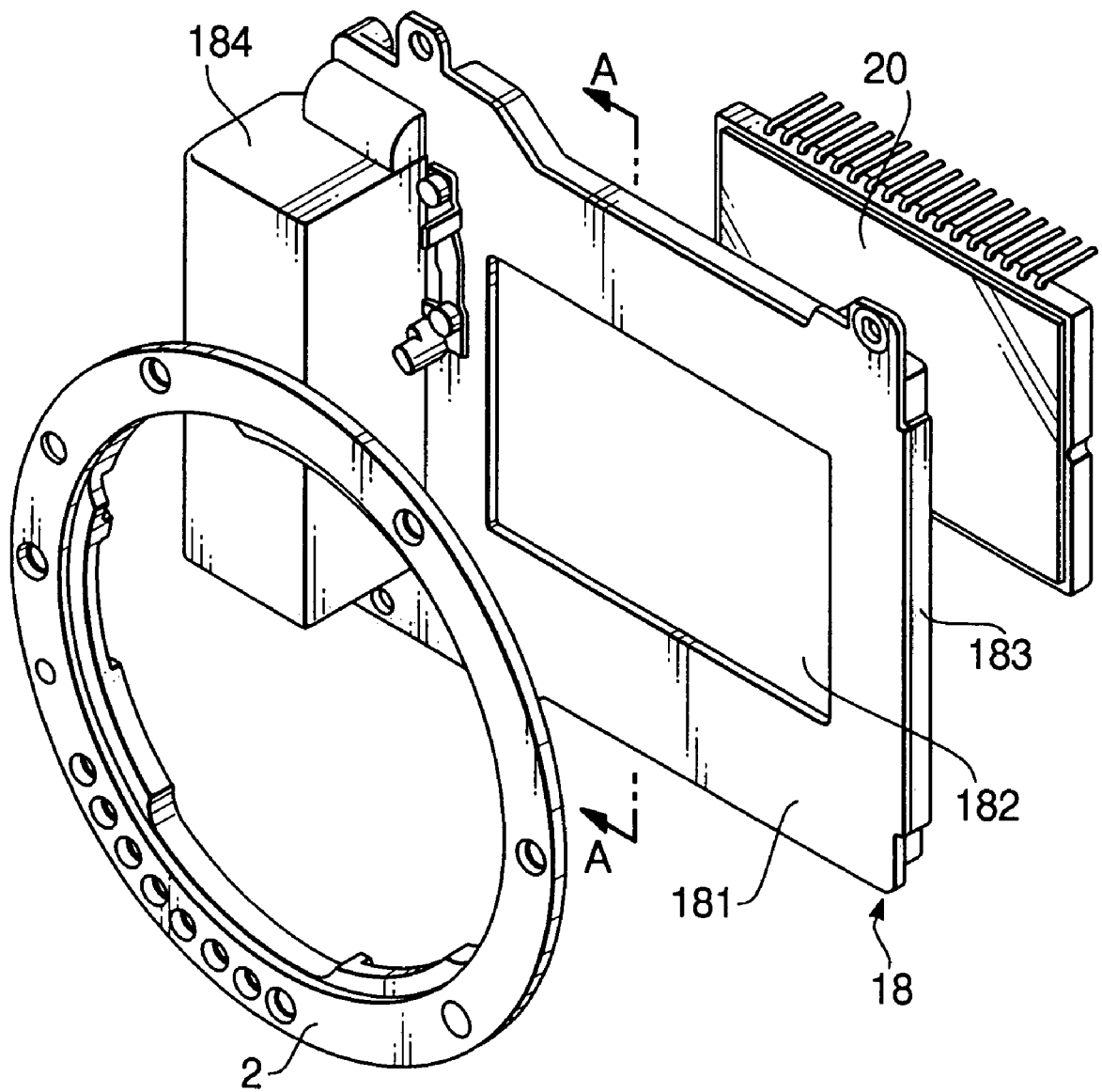
FIG. 3 is an exploded perspective view of main components of the digital camera according to an illustrative embodiment of the invention.
Figure 4:
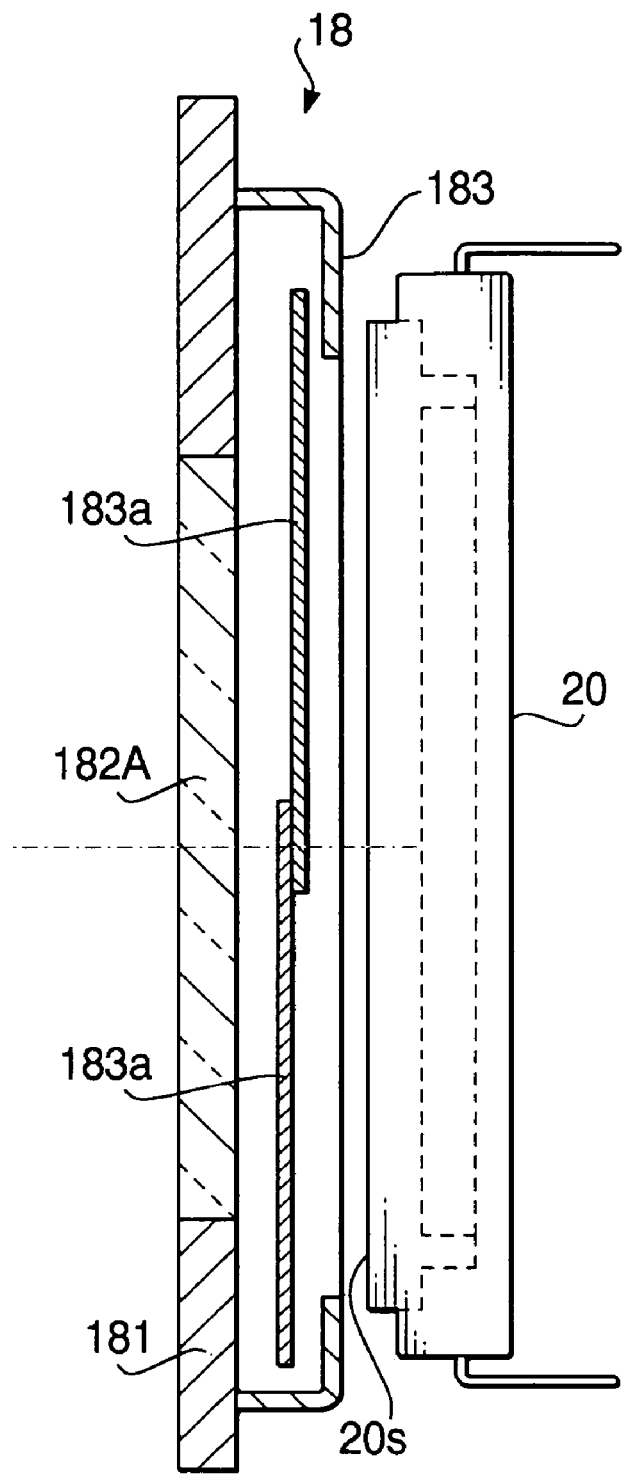
FIG. 4 is a cross-sectional side view of main components of the digital camera taken along a line A-A in FIG. 3 according to the embodiment of the invention.

FIG. 3 is an exploded perspective view of main components of the digital camera 1000 according to an illustrative embodiment of the invention. FIG. 4 is cross-sectional view of main components of the digital camera 1000 taken along the line A-A in FIG. 3 according to the embodiment of the invention. The shutter unit 18 includes a shutter panel 181, a shutter blade unit 183, and a known shutter drive unit 184. The shutter panel 181 is provided with a rectangular aperture portion 182 wherein the object image from the photographing lens is transmitted through. The shutter blade unit 183 is fixed to the shutter panel 181, and includes shutter blades 183a that are operated to open and close the aperture. The shutter drive unit 184 is fixed to one side of the shutter panel 181 and drives the shutter blades 183a to open and close.

It should be noted that a conventional shutter panel is formed as an opaque panel with a rectangular opening in the center. The aperture portion 182 is formed with a transparent resin panel 182A, which is the optical LPF, and is formed integrally to the shutter panel 181. Further, as seen in FIG. 2, an image receiving area 20S of the imaging element 20 in the present invention is not provided with a conventional optical LPF. The image receiving area 20S of the imaging element 20 is positioned distinctly close to a rear area of the shutter unit 18. In this embodiment, a protective glass is provided in front of the imaging element as a unit, therefore, the front surface of the protective glass is adjacent to the rear area of the shutter unit 18.

Figure 5A:
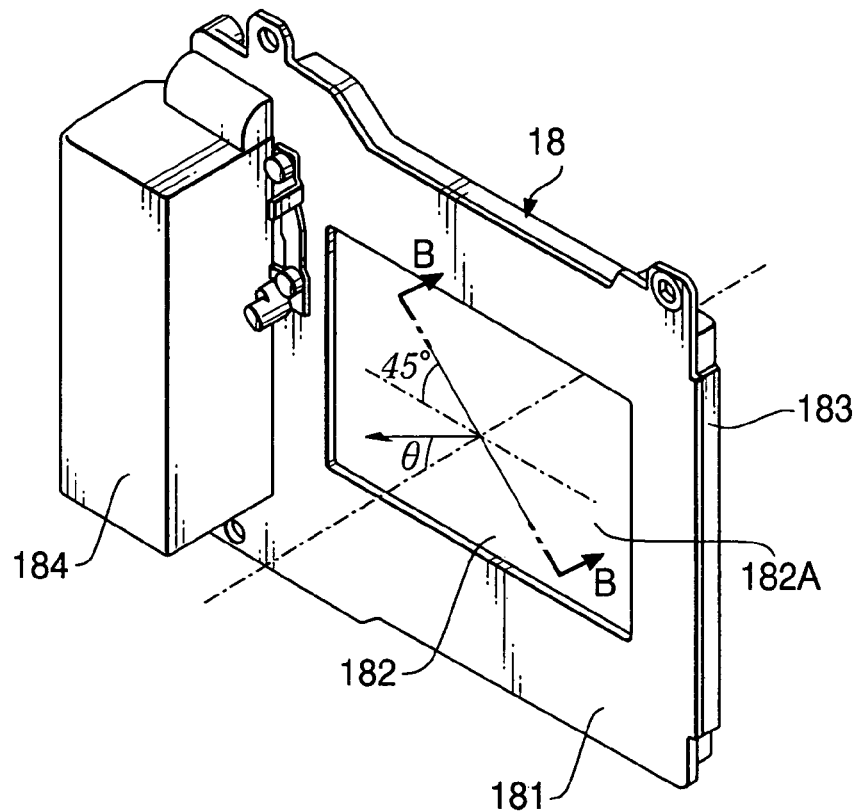
FIG. 5A is a perspective view of a shutter unit made of a birefringent resin panel according to an illustrative embodiment of the invention.
Figure 5B:
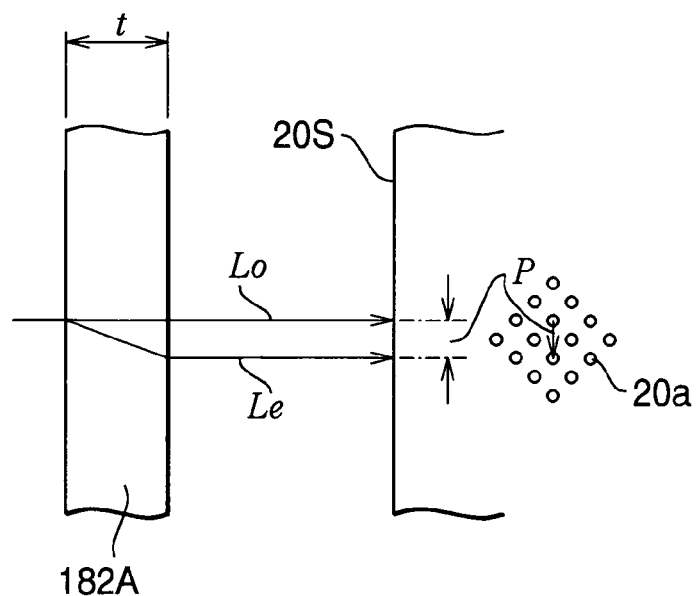
FIG. 5B is a cross-sectional view of the shutter unit with the birefringent resin panel taken along a line B-B in FIG. 5A according to an illustrative embodiment of the invention.

FIG. 5A is a perspective view of an aperture unit made of birefringent resin panel according to an illustrative embodiment of the invention. FIG. 5B is a cross-sectional side view of the aperture unit with the birefringent resin panel taken along the line B-B in FIG. 5A according to an illustrative embodiment of the invention. The line B-B is inclined at 45 degrees relative to the horizontal axis of the resin panel 182A. The shutter panel 181 includes the aperture portion 182 with the transparent resin panel 182A, and the shutter panel 181 is formed with non-transparent resin, for example black polycarbonate. The shutter panel 181 and the transparent resin panel 182A can be formed in a molding method such as coinjection molding, which is a method to form different materials in one mold pattern. Certain kinds of resin possess birefringency depending on the flow orientation of the molding. Therefore, when the shutter panel 181 is formed, the mold pattern wherein the flow orientation of the material is in a certain direction is used, so as the resin is molded with the crystal axis thereof oriented in a predetermined direction to obtain a desired birefringency. The molded resin panel 182A is thus configured to be an optical LPF with the desired birefringency.

In this embodiment, as seen in FIG. 5A, the resin panel 182A is configured to have the crystal axis oriented in an angle θ relative to the optical axis, which is substantially perpendicular to the surface of the resin panel 182A. The light from the object though the resin panel 182A with a thickness t is refracted as an ordinary ray Lo and an extraordinary ray Le with different refractive indexes, each of which forms an image on the image receiving area 20S of the imaging element 20 with a separation distance P therebetween (see FIG. 5B). The right-hand side of FIG. 5B shows the light transmitted through the resin panel 182A, which is split into the ordinary ray Lo and the extraordinary ray Le. The ordinary ray Lo and the extraordinary ray Le are respectively transmitted to pixels 20a of the imaging element 20. When the distance P is configured to properly match the pitch between the pixels 20a, the object image is doubled, and the output image is slightly blurred. Therefore, the interference between the uniformity of the pixels 20a and the pattern of the object image is avoided, and the false color is prevented from occurring on the output image. Thus the resin panel 182A serves as an optical LPF.

When the refractive index of the ordinary ray Lo is represented by "no" and the refractive index of the extraordinary ray Le is represented by "ne", P is represented by the following expression:

$$P = t \cdot (ne^2 - no^2) \cdot \sin 2\theta / (no^2 \sin^2 \theta + ne^2 \cos^2 \theta)$$

When, for example, P=0.01 mm and t=1 mm, the angle θ is calculated as follows.

When the material for the resin panel 182A is polyethylene, no=1.54, ne=1.584, and θ=10.6 degrees. When the material is polycarbonate, no=1.59, ne=1.696, and θ=4.75 degrees. Further, when the material is polyvinyl chloride, no=1.52, ne=1.547, and θ=17.5 degrees.

The resin panel 182A formed as above is configured to be the aperture portion 182 of the shutter unit 18 and placed in front of the image receiving area 20S of the imaging element 20 as the optical LPF. Therefore, the optical LPF is not required to be positioned between the shutter and the imaging element in this embodiment, as the conventional digital camera required This structure allows the image receiving area 20S of the imaging element 20 to be positioned distinctly close to the rear area of the shutter unit 18, and the imaging element 2 to be arranged closer to the shutter unit 18, and the camera body 1 is downsized in depth.

Further, it should be noted that in this embodiment the resin panel 182A is integrally formed with the shutter unit 18 and not configured independently from the shutter unit 18, therefore a process to assemble the optical LPF with the imaging element 20 and the camera body 1 can be omitted, which results cost reduction in manufacturing.

In addition, when dust adhered to the surface of the resin panel 182A is removed, the resin panel 182A is exposed through the opening of the lens mount 2 by moving the movable half mirror 11 to the uplifted position, and the dust can be effectively and nondestructively removed from the surface of the resin panel 182A. Further, even when some dust is adhered to the surface of the resin panel 182A, the dust is positioned closer to the surface of the imaging element 20 for the amount of thickness of the optical LPF 19 compared to the conventional camera. Therefore, image of the dust is blurred substantially enough so that the object image captured is not affected by the image of the dust.

Second Embodiment

Figure 6A:
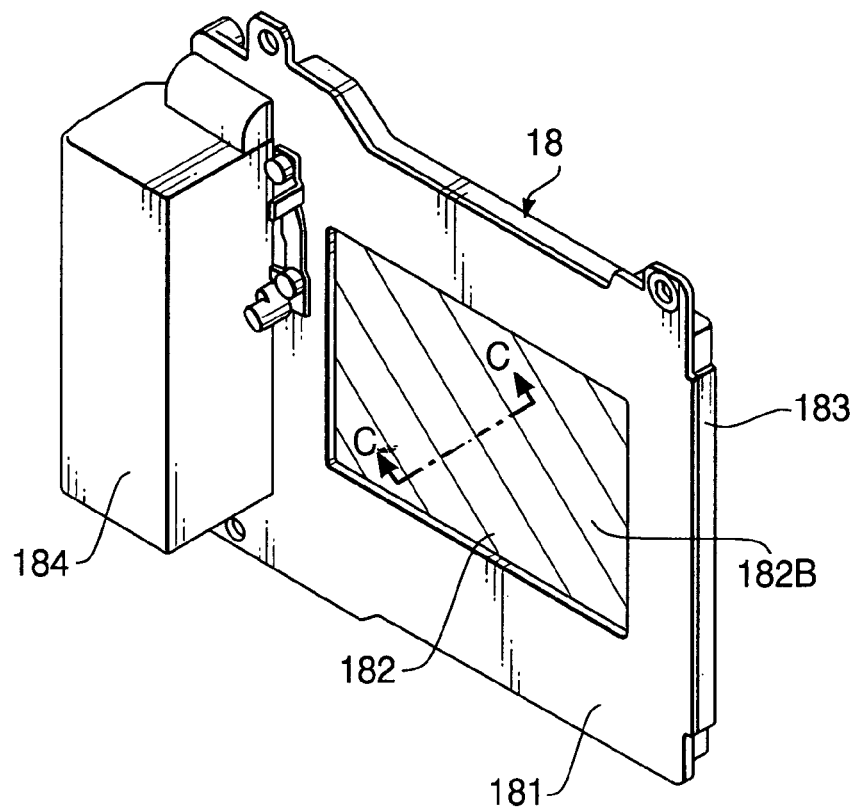
FIG. 6A is a perspective view of a shutter unit with a diffraction grating resin panel according to a second illustrative embodiment of the invention.
Figure 6B:
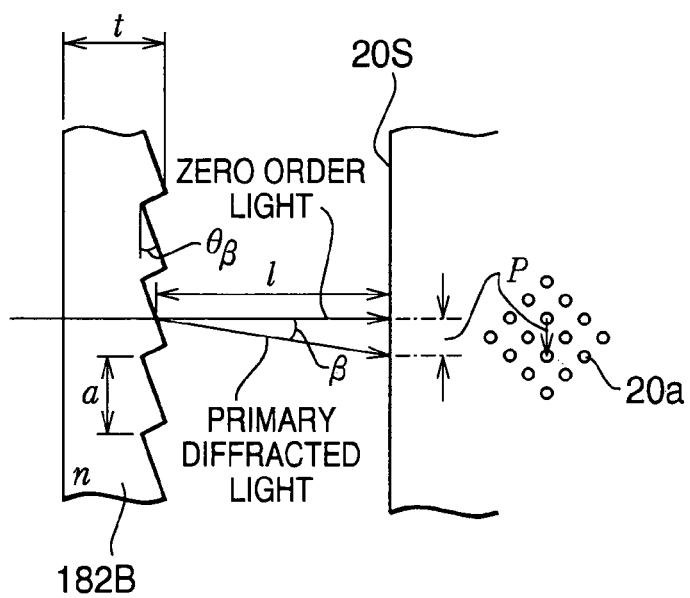
FIG. 6B is a cross-sectional view of the shutter unit with the diffraction grating resin panel taken along a line C-C in FIG. 6A according to the second illustrative embodiment of the invention.
Figure 7:
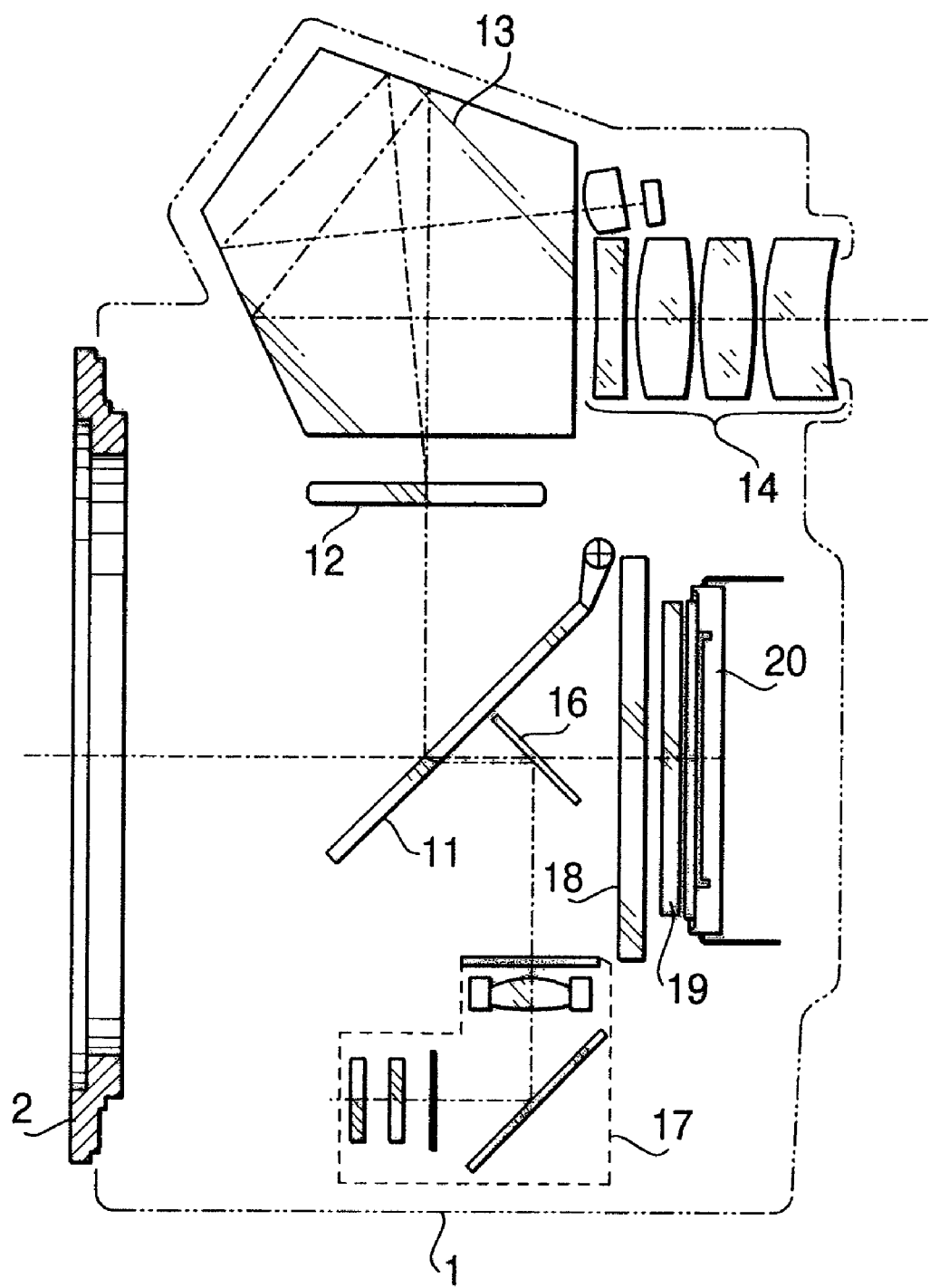
FIG. 7 is a cross-sectional view of main components of a known digital camera.

An appearance of a digital camera according to a second embodiment of the present embodiment is similar to the appearance of the digital camera 1000 in the first embodiment. The aperture portion 182 of the shutter panel 181 is formed with a diffraction grating resin panel 182B in the second embodiment instead of the birefringent resin panel. FIG. 6A is a perspective view of the shutter unit 18 with the diffraction grating resin panel according to a second illustrative embodiment of the invention. FIG. 6B is a cross-sectional side view of the shutter unit 18 with the diffraction grating resin panel taken along the line C-C in FIG. 6A according to the second illustrative embodiment of the invention. In this embodiment, the configuration corresponding to the configuration of the first embodiment is referred to by the same reference numbers, and description of those is omitted. The diffraction grating resin panel 182B is provided with indented phases on the rear surface thereof. Each phase is incised in a predetermined angle (i.e., a blaze angle) to the surface of the aperture portion 182. The light transmitted through the resin panel 182B is divided into a zero order light, which is parallel to the normal line, and a primary diffracted light, which is separated from the zero order light in an angle β, each of which forms an image on the image receiving area 20S of the imaging element 20 with a separation distance P therebetween (see FIG. 6B). When the distance P is configured to properly match to the pitch between the pixels 20a, the object image is doubled, and the output image is slightly blurred. Therefore, the interference between the uniformity of the pixels 20a and the pattern of the object image is avoided, and the false color is prevented from occurring on the output image. Thus the resin panel 182B is served as an optical LPF.

Here, the relation of a wavelength of the light (represented by λ), a grating pitch (represented by d), a number of grates (represented by N), a blaze angle (represented by θB), a refractive index (represented by n), and order of diffraction (represented by m), and a distance between the receiving area 20S of the imaging element 20 and the grating (represented by 1) is expressed in the following equations:

$$\sin \beta = Nm\lambda$$

$$N = 1/d$$

$$n \cdot \sin \theta B = \sin(\theta B + \beta)$$

$$\theta B = \tan^{-1}\left(\frac{Nm\lambda}{n - \sqrt{1 - (Nm\lambda)^2}}\right)$$

$$\tan \beta = P/1$$

When, for example, P=0.01 mm, 1=5 mm, λ=550 nm, N=3636, and the material is polymethyl methacrylate, n=1.49 and θB=0.23 degrees. When the material is polycarbonate or polystyrene, for example, n=1.59 and θB=0.19 degrees.

The resin panel 182B formed as above is configured to be the aperture portion 182 of the shutter unit 18 and placed in front of the image receiving area 20S of the imaging element 20 as the optical LPF. Therefore, the optical LFP is not required to be positioned between the shutter and the imaging element in this embodiment, as the conventional digital camera required. This structure allows the image receiving area 20S of the imaging element 20 to be positioned distinctly close to the rear area of the shutter unit 18, and the imaging element 2 to be arranged closer to the shutter unit 18, and the camera body 1 is downsized in depth.

Further, it should be noted that in this embodiment the resin panel 182B is integrally formed with the shutter unit 18 and not configured independently from the shutter unit 18, therefore a process to assemble the optical LFP with the imaging element 20 and the camera body 1 can be omitted, which results cost reduction in manufacturing.

In addition, when dust adhered to the surface of the resin panel 182B is removed, the resin panel 182B is exposed through the opening of the lens mount 2 by moving the movable half mirror 11 to the uplifted position, and the dust can be effectively and nondestructively removed from the surface of the resin panel 182B. Further, even when some dust is adhered to the surface of the resin panel 182B, the position where the dust is adhered is closer to the surface of the imaging element 20 for the amount of thickness of the optical LPF 19 compared to the conventional camera. Therefore, image of the dust is blurred substantially enough so that the object image captured is not affected by the image of the dust.

The resin panel that functions as an optical LPF in the present invention is not limited to the birefringent resin panel described in the first embodiment and the diffraction grating resin panel described in the second embodiment. A transparent resin panel made of another material may be similarly adapted to function as an optical LPF. Each of the resin panels described in the first and second embodiments is formed integrally with the shutter panel. The shutter panel may have an opening as an aperture, and a resin panel formed separately may be embedded or adhered to the shutter panel. It should be noted, however, in this case the resin panel is required to be produced independently, therefore a process to assemble the resin panel with the imaging element 20 is required, which may increases cost in manufacturing.

In the above described embodiments, the invention is applied to SLR digital cameras. However, the present invention may be similarly applied to a digital camera having a shutter in front of an imaging element.

The present disclosure relates to the subject matter contained in Japanese Patent Application No. 2004-335445, filed on Nov. 19, 2004, which is expressly incorporated herein by reference in its entirety.

What is claimed is:

1. A digital camera, comprising:
    an imaging element having a plurality of pixels;
    a shutter unit configured to intercept light transmitted from an object to the imaging element, the shutter unit comprising a shutter panel having an aperture; and
    an optical low pass filter comprising a transparent resin and configured to allow light having predetermined lower spatial frequencies to pass therethrough, the optical low pass filter being provided in the aperture of the shutter panel, and being integrally formed with the shutter panel, a surface of said optical low pass filter being co-planar with a surface of the shutter panel.

2. The digital camera according to claim 1, wherein the optical low pass filter includes a birefringent element comprising the transparent resin.

3. The digital camera according to claim 2, wherein the transparent resin comprises at least one of polyethylene, polycarbonate, and polyvinyl chloride.

4. The digital camera according to claim 1, wherein the optical low pass filter is configured to split the light transmitted from the object.

5. The digital camera according to claim 1, wherein the optical low pass filter includes a diffractive grating comprising transparent resin.

6. The digital camera according to claim 5, wherein the transparent resin comprises at least one of polymethyl methacrylate, polycarbonate, and polystyrene.

7. The digital camera according to claim 1, wherein the shutter unit comprises a focal-plane shutter configured to open and close the aperture.

8. The digital camera according to claim 1, the transparent resin of the optical low pass filter being configured to have a diffraction grating on a surface facing the imaging element.

9. The digital camera according to claim 1, a light incident surface of the optical low pass filter being configured to be coplanar with a light incident surface of the shutter panel.

10. A shutter unit for a digital camera configured to intercept light transmitted from an object to an imaging element, the shutter unit comprising:
    a shutter panel having an aperture; and
    an optical low pass filter comprising a transparent resin, and configured to allow light having predetermined lower spatial frequencies to pass therethrough, wherein
    the optical low pass filter is provided in the aperture of the shutter panel and being integrally formed with the shutter panel, a surface of said optical low pass filter being co-planar with a surface of the shutter panel.

11. The shutter unit according to claim 10, wherein the optical low pass filter includes a birefringent element comprising the transparent resin.

12. The shutter unit according to claim 11, wherein the transparent resin comprises at least one of polyethylene, polycarbonate, and polyvinyl chloride.

13. The shutter unit according to claim 10, wherein the optical low pass filter is configured to split the light transmitted from the object.

14. The shutter unit according to claim 10, wherein the optical low pass filter includes a diffractive grating comprising the transparent resin.

15. The shutter unit according to claim 14, wherein the transparent resin comprises at least one of polymethyl methacrylate, polycarbonate, and polystyrene.

16. The shutter unit according to claim 10, further comprising:
    a focal-plane shutter configured to open and close the aperture.

17. The shutter unit according to claim 10, the transparent resin of the optical low pass filter being configured to have a diffraction grating on a surface facing the imaging element.

18. The shutter unit according to claim 10, a light incident surface of the optical low pass filter be configured to be coplanar with a light incident surface of the shutter panel.

* * * * *